Nov. 21, 1967 — L. HOFFMANN — 3,353,397
STRESS DISTRIBUTION MEANS
Filed Feb. 11, 1965 — 2 Sheets-Sheet 2

INVENTOR.
LEO HOFFMANN
BY Seidel & Gonda
ATTORNEYS.

United States Patent Office 3,353,397
Patented Nov. 21, 1967

3,353,397
STRESS DISTRIBUTION MEANS
Leo Hoffmann, Chester, Pa., assignor to Baldwin-Lima-Hamilton Corporation, Philadelphia, Pa., a corporation of Pennsylvania
Filed Feb. 11, 1965, Ser. No. 431,941
5 Claims. (Cl. 72—455)

ABSTRACT OF THE DISCLOSURE

A frame structure for machinery having more than one rigid structural member comprising a stress distribution device between structural members, said device including a non-compressible elastically deformable member occupying a space in one of the structural members, and a pressing element on the other of said members complemental with said space and overlying the deformable member so that the deformable member absorbs and distributes stresses transmitted to it by the pressing element.

---

This invention relates to a stress distribution means, and more particularly, to means for eliminating or reducing stress concentrations created by combinations of bending forces and tensile or compressive forces at the points where a rod is coupled to a crosshead or the like on a forming press.

If the contact areas of force-exerting to force-restraining surfaces are not uniformly distributed around a tie rod or column cross section due to deflection of any of the stressed members, the resulting additional bending stresses can frequently very significantly increase the design stresses and thereby create critical stress concentrations. Spherical seats or washers have been suggested for use to distribute stresses at such points and eliminate such stress concentration. Such arrangements however involve a great deal of friction and wear on the contact surfaces. Also, such arrangements are unsatisfactory or undesirable on machines subjected normally to constant repetition of operational stress changes, such as in a forging press.

The present invention is directed to a stress distribution means for such contacting surfaces and converts the combined stress concentrations into a substantially single stress pattern. This effect is obtained by utilizing a relatively non-compressible but flow-yielding elastomer material such as rubber. A fixed volume cavity is provided adjacent the location of contact between the stress members and completely filled by the elastomer. In this manner, the elastomer may be caused to flow in a manner comparable to "hydraulic" flow. Means are provided to prevent extrusion or leakage of the elastomer around the movable contact edges.

Aside from the very small molecular compressibility of rubber under pressure, no reduction in the rubber-occupied total cavity volume occurs during operation. However, the cross-sectional volume of the rubber at various circumferential points of the cavity will change when the pressure changes, thereby enabling the longitudinal axis of the tie rod to change with respect to a reference surface. Since the press member deflection is a relatively slow process dependent upon the speed of the press operation, hysteresis and/or vibrations in the elastomer are so small and therefore immaterial or do not exist.

In order not to destroy the resiliency and flowability of the rubber material, internal heat in the rubber material is taken into consideration. The heat developed by molecular rearrangements in the rubber material is absorbed by surrounding surfaces of the press which are of sufficient mass and wall thickness. The choice of a rubber material as a "hydraulic" medium is desirable because of its relatively low deformation force requirements, and because leakage or extrusion can be prevented in a simple manner.

It is an object of the present invention to provide a novel stress distribution means.

It is another object of the present invention to provide a means for compensating for the misalignment between the tie rod and a frame member.

It is another object of the present invention to provide a stress distribution means which simulates "hydraulic" flow while eliminating wearing surfaces.

It is another object of the present invention to provide a stress distribution device for tie rods of a forging press which compensate for bending forces introduced into the tie rod while eliminating frictional wearing surfaces.

It is another object of the present invention to provide a stress distribution means which can accommodate a variety of deflection angles for a tie rod by utilizing a plurality of units spaced longitudinally along the tie rod.

Other objects will appear hereinafter.

For the purpose of illustrating the invention, there are shown in the drawings forms which are presently preferred; it being understood, however, that this invention is not limited to the precise arrangements and instrumentalities shown.

Referring to the drawing in detail, wherein like numerals indicate like elements, there is shown in FIGURE 1, a forging press designated generally as 10.

Figure 1:
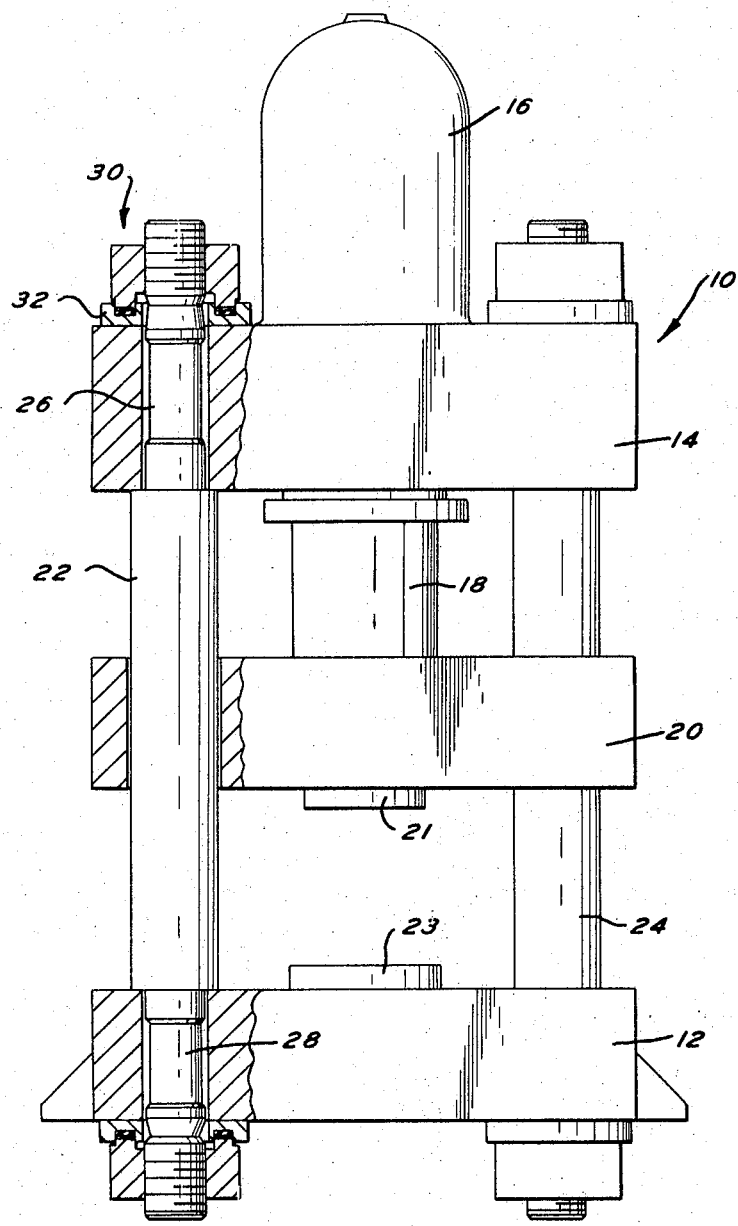
FIGURE 1 is an elevation view of a forging press incorporating the stress distribution means of the present invention.

The forging press 10 is exemplary of a forming press wherein stress distribution patterns may become significant. The press 10 includes a lower crosshead 12 which may be stationary and a stationary crosshead 14 thereabove. The crosshead 14 supports a cylinder 16. A piston rod 18 has its upper end connected to a piston within the cylinder 16. Conduits for supplying and exhausting motive fluid to and from the cylinder 16 are provided but not shown.

The lower end of the piston rod 18 is connected to a platen 20. The juxtaposed faces of the platen 20 and crosshead 12 support dies 21 and 23 respectively. Parts to be forged will be placed on die 23 in a conventional manner. Thereafter, the platen 20 will descend and cause the part to be shaped so that it conforms with the die cavity in dies 21 and 23. When the part to be shaped is of irregular cross section, a bending force as well as tensile forces are present in tie rods 22 and 24 which interconnect the crossheads 12 and 14. This is due to deflections caused by the force differences on the tie rods.

The tie rods 22 and 24 are exemplary. That is, a press may have two or more tie rods. Each of the tie rods is structurally interconnected with the crosshead in a similar manner. Further, in the illustrated embodiment the crossheads 12 and 14 are each structurally interrelated with the tie rod 22 in the same manner. Accordingly, only the structural interrelationship between the crosshead 14 and the tie rod 22 will be described in detail.

It will be noted that the tie rod 22 has reduced diameter portions 26 and 28 which extend through aligned holes in the crossheads 14 and 12 respectively. Also, it will be noted that the platen 20 is guided during its reciprocatory movement by the intermediate portion of the tie rod 22.

Figure 2:
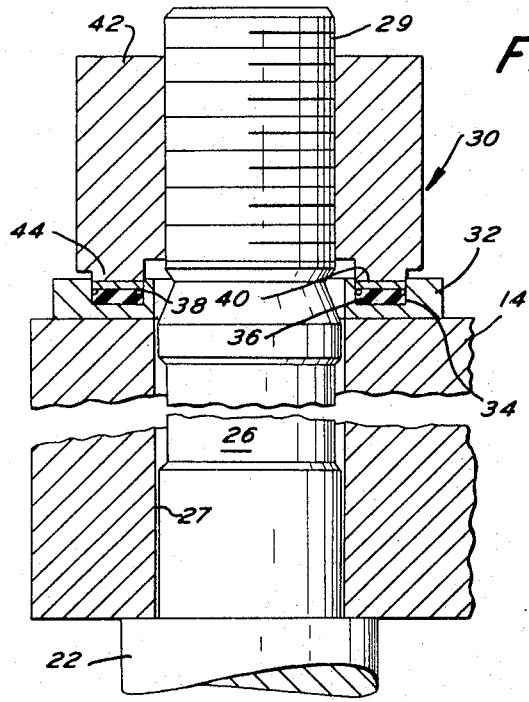
FIGURE 2 is an enlarged detail view of the stress distribution means illustrated in FIGURE 1.

As shown more clearly in FIGURE 2, the reduced diameter portion 26 has a portion of reduced axial length in abutting contact with the hole 27 in the crosshead 14. The end of the tie rod 22 terminates in a threaded portion 29 which projects beyond the crosshead 14. A stress distribution device 30 surrounds the portion 29.

The device 30 includes a plate member 32 supported by crosshead 14 and having an annular cavity or groove 34 therein. The groove 34 is radially spaced from the inner and outer peripheral surfaces of the member 32 so that elements disposed within the groove cannot contact the tie rod 22. At the bottom of the groove 34, there is provided a relatively non-compressible but flow-yielding elastomer material such as rubber in the form of an annular washer. Washer 36 may have an axial thickness which is approximately one-half the axial depth of the groove 34, but such proportion depends upon the desired elastomeric characteristic.

A pressing element in the form of a metal washer 40 is provided within the groove 34 and in overlying engagement with the juxtaposed face of the rubber washer 36. The dimensions of the inner and outer peripheral surfaces of the groove 34 are designed so that the metal washer 40 acts like a piston. For example, a clearance of about .003 to .005 inch may be provided.

A reinforcement in the form of a coil spring 38 made from a metal or the like is imbedded in the rubber washer 36 at the intersection of the outer peripheral surface thereof and the major face of the washer 36 juxtaposed to the washer 40. A corresponding spring 38' is provided in the washer 36 on the inner peripheral surface thereof. Springs 38 and 38' are preferably molded into the rubber washer 36. The springs 38 and 38' aid in sealing the rubber washer 36 against leakage or extrusion past the inner and outer peripheral surfaces of the washer 40.

A head 42 is threadedly coupled to the threaded portion 29. If desired, head 42 may be integral with the terminal end portion of the tie rod 22. A contact member 44 is provided between the head 42 and the washer 40. As illustrated, member 44 is integral with the head 42 and positioned to transmit force to the washer 40.

When the tie rod 22 is subjected to forces other than straight line tensile forces, the longitudinal axis thereof may deflect with respect to the longitudinal axis of piston rod 18. Such deflection forces are transmitted through the contact member 44 to the washer 40 and ultimately to the rubber washer 36. The rubber washer 36 is strictly confined in the cavity defined by groove 34 and washer 40. However, deflection forces will change the cross-sectional shape of the confining cavity thereby causing the rubber washer 36 to flow and conform to such shape. The rubber washer is subjected to "hydraulic" flow and the elastomeric properties thereof are not exceeded because of the small distance of flow, so that a combination of reversible and non-reversible molecular rearrangements can take place in the rubber material of the washer 36. The coil springs 38 and 38' are positioned at the two locations most likely subjected to leakage or extrusion and therefore prevent such leakage or extrusion. As soon as such deflection forces are removed, the elements assume their position as illustrated in FIGURE 2. Compression stresses in the rubber washer 36 up to 10,000 p.s.i. or more are being successfully used. The force-exerting and flow-restraining surfaces are uniformly distributed around the tie rod 22 by use of the present invention.

Figure 3:
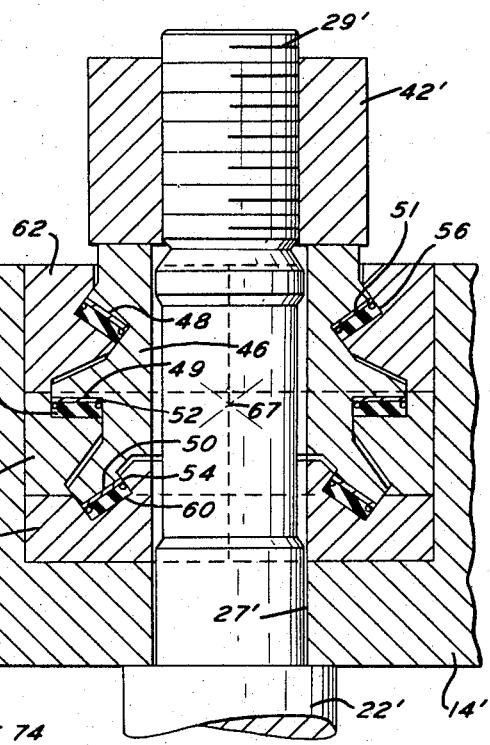
FIGURE 3 is an enlarged detail view similar to FIGURE 2 but illustrating another embodiment of the present invention.

There is shown in FIGURE 3 another embodiment of a stress distribution device identical with that described above except as will be made clear hereinafter. Accordingly, corresponding primed numerals are provided in FIGURE 3 wherever applicable.

In FIGURE 3, the crosshead 14 is recessed around the hole 27' through which the tie rod 22' extends. In place of a single plate member such as member 32, the embodiment in FIGURE 3 includes a plurality of split annular plate members 62, 64 and 66. Plate member 66 is provided with a groove within which is disposed a rubber washer 60 and a metal washer 54 corresponding identically to washers 36 and 40 respectively. It will be noted that the bottom surface of the groove which receives washer 60 is disposed at an angle of approximately 45° with respect to the longitudinal axis of tie rod 22'.

An annular contact member 46 is provided. Member 46 is provided with a contact face 50 which is in abutting contact with washer 54. Contact member 46 is a separate element as opposed to being integral with the head 42'.

Member 64 surrounds member 46 and has a face in abutting engagement with a juxtaposed face on member 66. Member 64 is provided with a notch on its inner peripheral surface for receiving rubber washer 58 and metal washer 52. The remainder of the cavity for these washers is defined by a face 49 on member 46 and the outer peripheral surface of the member 46. Face 49 is perpendicular to the longitudinal axis of tie rod 22'.

Member 62 has a face in abutting contact with an adjacent face of the member 64. Member 62 also has a notch on its inner periphery for receiving rubber washer 56 and metal washer 51. A face 48 on member 46 is juxtaposed to the metal washer 51. The remainder of the cavity for washers 51 and 56 is defined by the outer peripheral surface of the member 46.

Thus, it will be noted that the embodiment in FIGURE 3 includes a single contact member adapted to transmit forces to a plurality of stress distribution devices. This embodiment is adaptable for use with softer rubber materials or where greater deflection angles are desired, or where larger heat-dissipation surfaces are needed to dispose of molecular friction heat in fast or frequently deflecting stress transfer area. The cavities all lie on a circle having its center at 67 on the longitudinal axis of the rod 22''. The stress distribution means of this embodiment is supported within a recess in frame member 14' so as to be substantially flush with the upper surface thereof. Hence, the overall height of the press is not increased. Otherwise, this embodiment is identical with the embodiment illustrated in detail in FIGURE 2.

Figure 4:
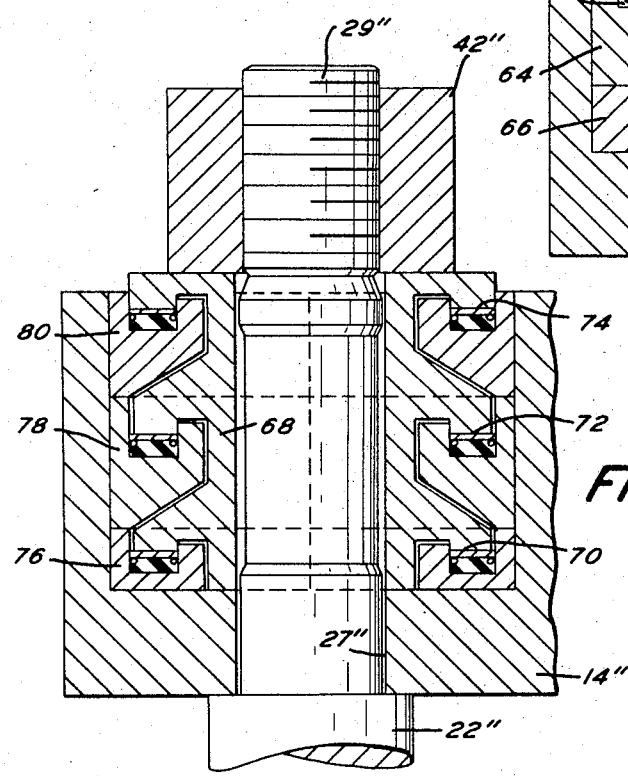
FIGURE 4 is an enlarged detail view similar to FIGURE 2 but illustrating still another embodiment of the present invention.

In FIGURE 4, there is illustrated another embodiment of the present invention which is similar to the embodiment in FIGURE 3. The embodiment in FIGURE 4 differs from the embodiment in FIGURE 3 by providing the annular contact member 68 with contact faces 70, 72 and 74 which are aligned and perpendicular to the longitudinal axis of tie rod 22''. Hence, each of the split annular plate members 76, 78 and 80 are provided with grooves defining three sides of the cavity for the rubber washers. The remaining side of the cavity is defined by the metal washers. Otherwise, the embodiment in FIGURE 4 is identical with the embodiment in FIGURE 3.

As higher yield point materials come into use in the design of machines like forging presses, and as the materials to be forged increase in strength, design of the machine to accommodate deflection or stress concentrations reaches a point where it is impractical or uneconomical. The various embodiments of the stress distribution device of the present invention offers a solution to solving such problems in deflection. In a practical embodiment of the present invention, the stress distribution devices are adapted to be utilized with tie rods having any practical diameter. In each embodiment of the present invention, the elastomer is disposed within a confined volume cavity corresponding to the cross-sectional volume of the elastomer, and the metal washer juxtaposed thereto acts on the elastomer like a piston. Aside from the metal washers, no portion of the cavity is movable with respect to the elastomer during operation. While the washer 40 and the corresponding washers in the embodiments of FIGURES 3 and 4 are preferably made from metal, high strength rigid plastic materials may be substituted therefor. As used hereinafter, a substantially noncompressible elastomer is intended to exclude materials considered to be compressible such as foam rubber and the like, but rather is directed to dense substantially uniform elastomers. Hereinafter, the crosshead of the machine 10 may be referred to as a frame member.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a frame member having an aperture therethrough, a rod extending through said aperture, a head on one end portion of said rod, said head overlying a portion of the frame member adjacent the aperture, and a stress distribution device between said head and said portion of said frame member, said device including means defining a confined space, said space defining means being an annular member surrounding said rod and having a groove on one face, structure including a substantially non-compressible elastomer capable of simulating hydraulic flow and occupying the entirety of said space, an annular metal member on an inner and outer peripheral surface of said elastomer, and an annular pressing element overlying said elastomer and within said groove, said annular metal member being juxtaposed to said pressing element, said pressing element being coupled to said elastomer and said head, whereby said elastomer absorbs stresses transmitted thereto from said rod.

2. In a forming press wherein parts are cyclically formed and wherein a frame member is coupled to rods extending through holes in the frame member, the improvement of a stress distribution device between said rods and frame member, said device including annular means on said frame member surrounding said rods, said means having a confined space partially defined by a pressing element, a non-compressible elastomer completely filling said space, said elastomer comprising a rubber ring having a coil spring imbedded therein at the intersections of a major face with the inner and outer peripheral surfaces thereof to inhibit extrusion of said elastomer past said pressing element, and a contact member coupled to said pressing element and said rod for transmitting stresses from said rod to said elastomer for absorption thereby.

3. Apparatus comprising a frame member having an aperture therethrough, a rod extending through said aperture, a head on one end portion of said rod, said head overlying a portion of the frame member adjacent the aperture, and a stress distribution device between said head and said portion of said frame member, said device including means coupled to one of said rod and said frame member defining a plurality of annular grooves at axially spaced locations along said rod, means coupled to said rod and said frame member defining a plurality of annular contact members axially spaced locations along said rod juxtaposed to the locations of said grooves, and a substantially non-compressible elastomer disposed in each of said grooves and coupled to one of said contact members for transmitting and absorbing stresses from said rod.

4. In a press in accordance with claim 3, said grooves and said contact members being disposed along an arc of a circle having its center on the longitudinal axis of said rod to facilitate lateral deflection of said rod with respect to said frame member.

5. In a press in accordance with claim 3, said elastomers being rubber rings, each of said rings having a coil spring imbedded therein at the intersections of a major face with the inner and outer peripheral faces thereof to inhibit extrusion of said elastomer past said contact members.

References Cited

UNITED STATES PATENTS

| 1,580,894 | 4/1926 | Hummel | 100—214 |
| 2,339,549 | 1/1944 | Kabaugh | 85—50 |
| 2,835,158 | 5/1958 | Bartlow | 85—50 |

FOREIGN PATENTS

| 905,225 | 3/1954 | Germany. | |

CHARLES W. LANHAM, *Primary Examiner.*

G. P. CROSBY, *Assistant Examiner.*

UNITED STATES PATENT OFFICE
CERTIFICATE OF CORRECTION

Patent No. 3,353,397                          November 21, 1967

Leo Hoffmann

It is hereby certified that error appears in the above numbered patent requiring correction and that the said Letters Patent should read as corrected below.

In the heading to the printed specification, lines 3 to 5, for "assignor to Baldwin-Lima-Hamilton Corporation, Philadelphia, Pa., a corporation of Pennsylvania" read -- assignor, by mesne assignments, to Baldwin-Lima-Hamilton Corporation, Philadelphia, Pa., a corporation of Delaware --.

Signed and sealed this 3rd day of December 1968.

(SEAL)
Attest:

Edward M. Fletcher, Jr.

Attesting Officer

EDWARD J. BRENNER

Commissioner of Patents